(12) United States Patent
Oka et al.

(10) Patent No.: US 6,972,834 B1
(45) Date of Patent: Dec. 6, 2005

(54) OPTICAL DISTANCE SENSOR

(75) Inventors: Toru Oka, Tokyo (JP); Hajime Nakajima, Tokyo (JP); Masahiro Shikai, Tokyo (JP); Akihide Shiratsuki, Tokyo (JP); Jurgen Mohr, Karlsruhe (DE); Ulrike Wallrabe, Karlsruhe (DE); Uwe Hollenbach, Karlsruhe (DE)

(73) Assignees: Mitsubishi Denki Kabushiki Kaisha, Tokyo (JP); Forschungszentrum Karlsruhe GmbH, Eggensttein-Leopoldshafen (DE)

( * ) Notice: Subject to any disclaimer, the term of this patent is extended or adjusted under 35 U.S.C. 154(b) by 491 days.

(21) Appl. No.: 10/182,770

(22) PCT Filed: Dec. 11, 2000

(86) PCT No.: PCT/JP00/08751
§ 371 (c)(1),
(2), (4) Date: Aug. 1, 2002

(87) PCT Pub. No.: WO02/48646
PCT Pub. Date: Jun. 20, 2002

(51) Int. Cl.$^7$ ............................ G01C 3/00; G01C 3/08

(52) U.S. Cl. .................... 356/3.01; 356/3.1; 356/3.11; 356/3.16

(58) Field of Search ............................ 356/3.01–3.16

(56) References Cited

U.S. PATENT DOCUMENTS

| 4,970,384 A | * | 11/1990 | Kambe et al. ............... 250/221 |
| 5,418,765 A | | 5/1995 | Misawa et al. |
| 6,198,862 B1 | | 3/2001 | Nakajima et al. |

FOREIGN PATENT DOCUMENTS

| CA | 2322419 | 9/1999 |
| EP | 1 031 865 | 8/2000 |
| JP | 10-9813 | 1/1998 |
| JP | 2000-28316 | 1/2000 |
| WO | 99/46612 | 9/1999 |

OTHER PUBLICATIONS

U.S. Appl. No. Unassigned, filed Aug. 1, 2002, Oka et al.

* cited by examiner

*Primary Examiner*—Bernarr E. Gregory
*Assistant Examiner*—Isam A. Alsomiri
(74) *Attorney, Agent, or Firm*—Leydig, Voit & Mayer, Ltd.

(57) ABSTRACT

An optical distance sensor includes a first substrate provided with a light emitting element and a light detecting element, a one-piece optical structure body on a second substrate, the optical structure body having optical elements for converging incident light in a direction parallel to a surface of the second substrate and for converging an outgoing light beam from the light emitting element and a light beam reflected by an object in the direction parallel to the surface of the second substrate, and lenses for converging incident light in a direction perpendicular to the surface of the second substrate and for converging the outgoing light beam from the light emitting element and the light beam reflected by the object in the direction perpendicular to the surface of the second substrate, respectively.

1 Claim, 9 Drawing Sheets

OPTICAL DISTANCE SENSOR

FIELD OF THE INVENTION

The present invention relates to an optical distance sensor that applies a light beam from a light emitting element to an object to be measured, detects a light beam reflected by the object by using a light detecting element, and measures a distance from a reference point to the object to be measured or a displacement of the object based on a triangulation technique.

The present invention relates to an optical distance sensor that applies a light beam from a light emitting element to an object to be measured, detects a light beam reflected by the object by using a light receiving element, and measures a distance from a reference point to the object to be measured or a displacement of the object based on a triangulation technique.

BACKGROUND OF THE INVENTION

FIG. 1 is a perspective view showing a prior art optical distance sensor that detects the location of an object to be measured by using a triangulation technique as disclosed in international patent application No. PCT/JP98/04144. In FIG. 1, reference numeral 1 denotes an input optical fiber, reference numeral 2a and 2b denote output optical fibers, reference numeral 3 denotes a three-layer waveguide in which a core layer 3a is sandwiched by two cladding layers 3b, the core layer 3a having a slightly higher refractive index than the two cladding layers 3b, reference numerals 4a and 4b denote plane mirrors each consisting of a side wall of the three-layer waveguide 3, each plane mirror being covered with a reflection coating, reference numerals 5a and 5b denote curved mirrors each being formed on a side wall of the three-layer waveguide 3, each curved mirror being covered with a reflection coating, reference numeral 6a and 6b denotes lens contact end portions each being formed on a side wall of the three-layer waveguide 3, reference numerals 7a and 7b denote cylindrical lenses, reference numeral 8a denotes a light beam emerging from the cylindrical lens 7a, reference numeral 8b denotes a light beam that is reflected by an object to be measured and is incident upon the other cylindrical lens 7b, and reference numeral 9 denotes a branch waveguide.

Next, a description will be made as to the operation of the prior art optical distance sensor.

A light beam used for detection is introduced into the three-layer waveguide 3 by way of the input optical fiber 1. The incident light beam is confined in a direction of the thickness of the waveguide and is brought to a focus at a predetermined position in a parallel direction to a surface of a substrate by the curved mirror 5a after it is reflected by the plane mirror 4a. The light, which has been reflected by the curved mirror 5a, emerges from the lens contact end portion 6a and is incident upon the cylindrical lens 7a. The light beam is then brought to a focus at a predetermined position in the direction of the thickness of the waveguide while its optical axis is deflected by the cylindrical lens 7a.

This light beam is then reflected by an object to be measured (not shown in the figure) placed forward of the outgoing light beam from the cylindrical lens, and is incident upon the other cylindrical lens 7b and is introduced, by way of the lens contact end portion 6b, into the three-layer waveguide 3 again. The introduced light beam is confined in the direction of the thickness of the waveguide and is reflected by the plane mirror 4b while it is converged in the parallel direction to a surface of a substrate by the curved mirror 5b, so that the light beam comes into a focus at a branching point of the branch waveguide 9. The light beam at the branching point is introduced into both the output optical fibers 2a and 2b after it is separated into two parts with a light power ratio corresponding to a position where the light beam is focused to the branching point of the branch waveguide 9.

The position of a light spot which is imaged at the branch point of the branch waveguide 9 changes according to the location of the object to be measured based on a triangulation technique. In other words, the ratio between the powers of two light beams respectively introduced into the output optical fibers 2a and 2b changes according to the location of the object to be measured. By measuring this change by using two photo detectors (not shown in the figure) connected to the two output optical fibers 2a and 2b, the location of the object to be measured can be determined.

A problem with the prior art optical distance sensor constructed as mentioned above is that since when producing the three-layer waveguide 3 having a function of converging in the parallel direction to a surface of a substrate, the core layer 3a and the two cladding layers 3b are laminated alternately, it is impossible to form the three-layer waveguide 3 in one process and the manufacturing cost therefore rises. Another problem is that since optical fibers are used as optical I/Os, the prior art optical distance sensor is hard to handle.

The present invention is proposed to solve the above-mentioned problems, and it is therefore an object of the present invention to provide a small-size, low-cost and easy-to-handle optical distance sensor.

DISCLOSURE OF THE INVENTION

In accordance with the present invention, there is provided an optical distance sensor that applies a light beam from a light emitting element to an object to be measured, detects a light beam reflected by the object by using a light receiving element, and measures a distance from a reference point to the object to be measured or a displacement of the object based on a triangulation technique, the optical distance sensor including: a first substrate provided with the light emitting element and the light receiving element; an optical structure body molded in one piece on a second substrate, the optical structure body having a plurality of optical elements intended for converging incident light in a parallel direction to a surface of the second substrate, each converging an outgoing beam from the light emitting element and a light beam reflected by the object to be measured in the parallel direction to the surface of the second substrate; and lenses intended for converging incident light in a perpendicular direction to the surface of the second substrate, for converging the outgoing beam from the light emitting element and the light beam reflected by the object to be measured in the perpendicular direction to the surface of the second substrate.

Consequently, since the plurality of optical elements intended for converging incident light in the parallel direction to the surface of the second substrate are molded in one piece as the optical structure body, the manufacturing cost can be reduced, each of the plurality of optical elements intended for converging incident light in the parallel direction to the surface of the second substrate can be downsized, and the accuracy of the relative position of each of the plurality of optical elements can be improved. Although reflection of the outgoing light beam or the detected light from the first or second substrate results in a loss in an optical signal generated, the reflection by the substrate can be reduced by arranging the lenses intended for converging incident light in the perpendicular direction to the surface of the second substrate and therefore such an advantage as improvements in the signal to noise ratio can be provided.

PREFERRED EMBODIMENTS OF THE INVENTION

Hereafter, to explain the present invention more in detail, preferred embodiments of the present invention will be explained with reference to the accompanied drawings.

Embodiment 1

Figure 1:
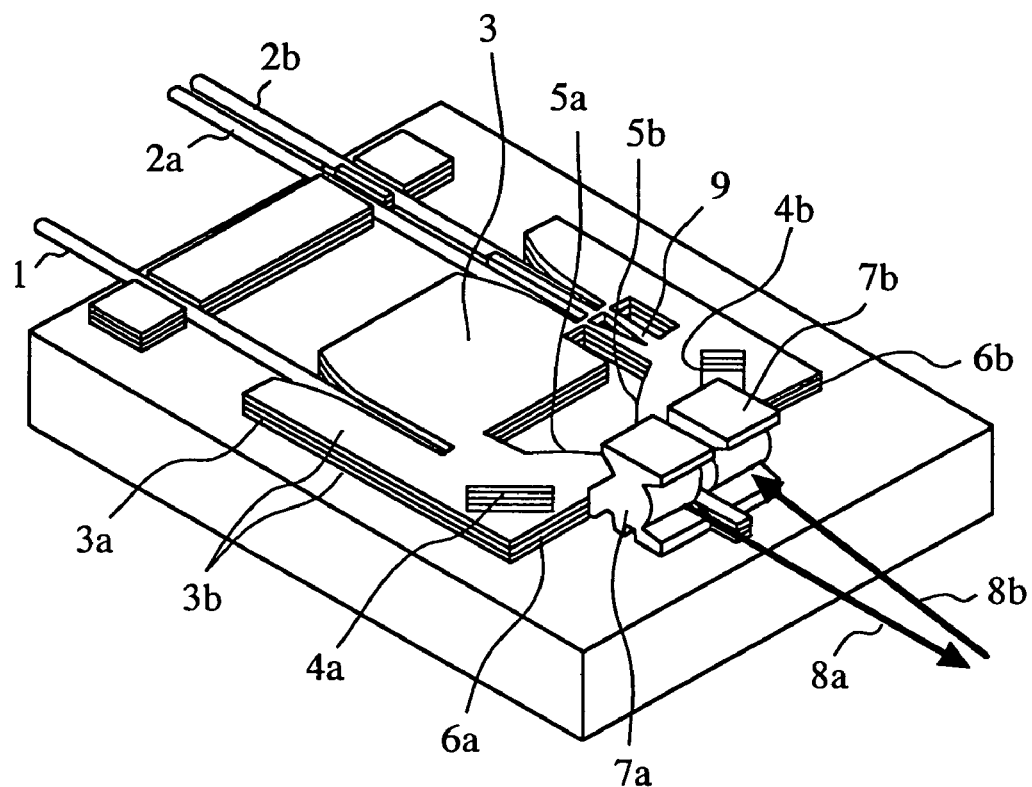
FIG. 1 is a perspective view showing a prior art optical distance sensor.
Figure 2:
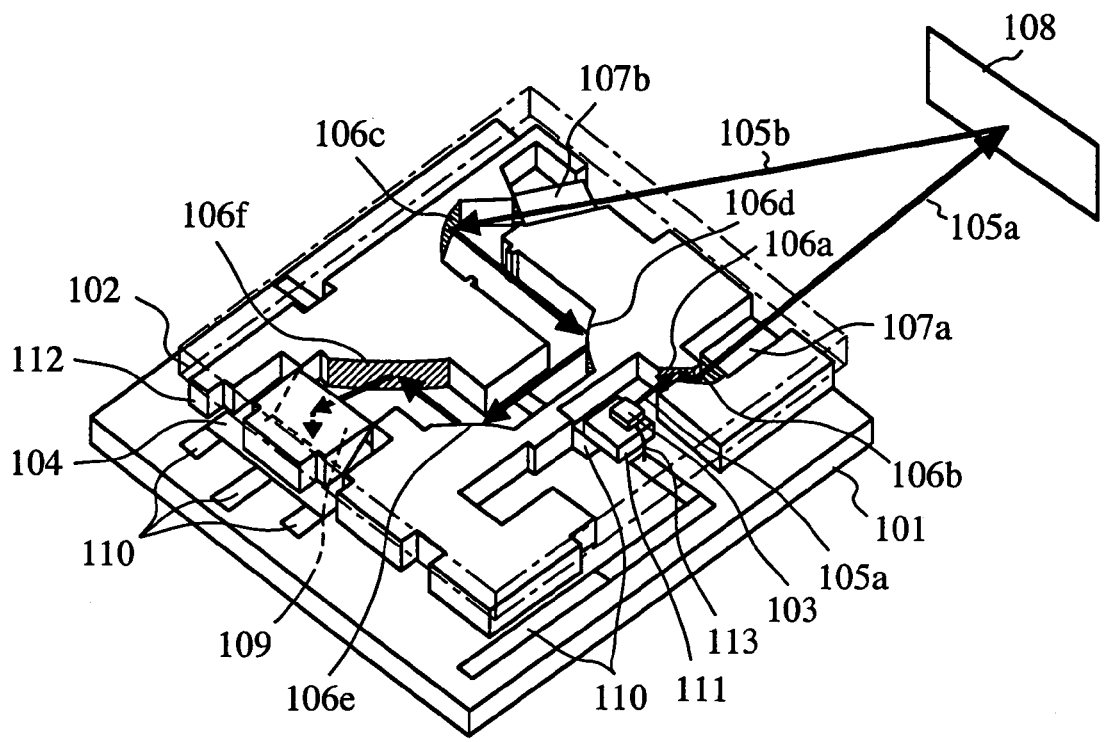
FIG. 2 is a perspective view showing an optical distance sensor according to embodiment 1 of the present invention.
Figure 3:
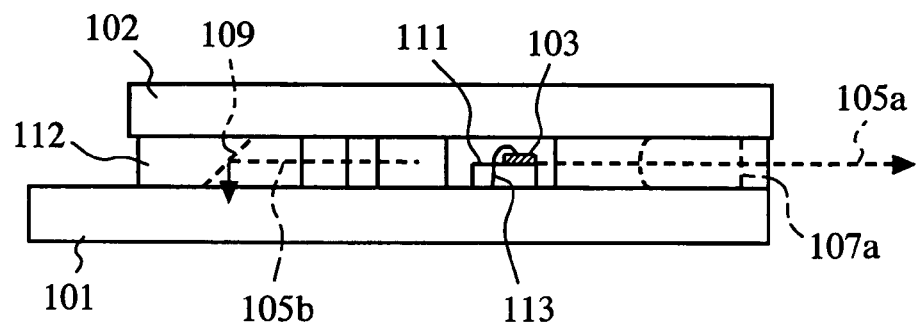
FIG. 3 is a side view showing the optical distance sensor according to embodiment 1.
Figure 4:
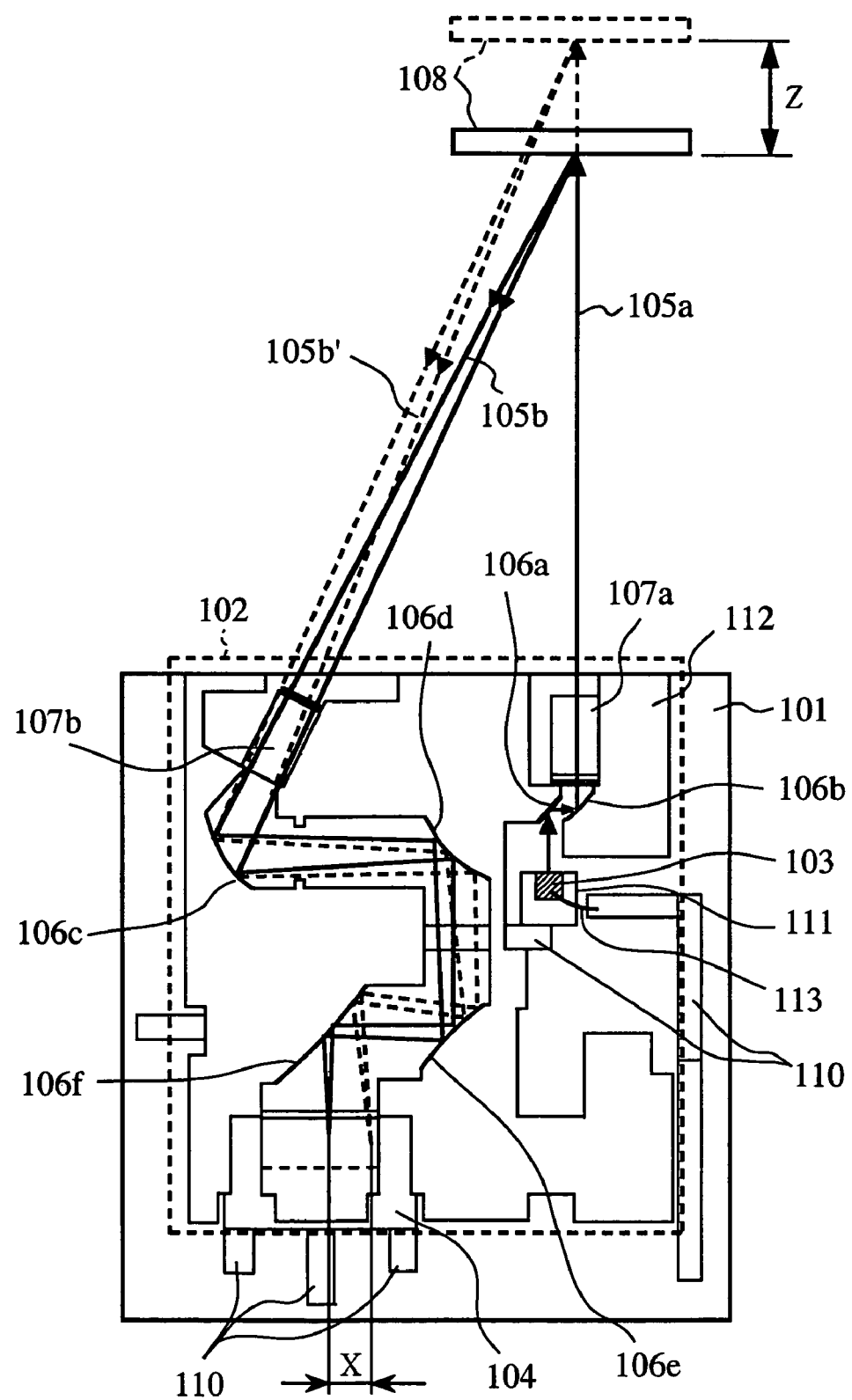
FIG. 4 is a plan view showing the optical distance sensor according to embodiment 1.

FIG. 2 is a perspective view showing an optical distance sensor according to embodiment 1 of the present invention, FIG. 3 is a side view of the optical distance sensor, and FIG. 4 is a plan view of the optical distance sensor. A light emitting element 103, such as a semiconductor laser or light emitting diode, as well as necessary electric wiring 110 are disposed, by way of a spacer 111, on a surface of a substrate 101 (first substrate) made of, for example, silicon in such a manner that the optical axis of an outgoing light beam 105a substantially agrees with the central axis of a lens 107a intended for converging a light beam incident thereupon in a perpendicular direction to a surface of a substrate in height, and a position sensitive light receiving element 104, such as a PSD (Position Sensitive Device) or divided type photo diode, is formed monolithically.

Under another substrate 102 (second substrate) made of such a material as ceramic, there is provided an optical structure body 112 provided with a plurality of mirrors 106a to 106f intended for converging incident light in a parallel direction to a surface of a substrate (optical elements intended for converging incident light in the parallel direction to a surface of a substrate), which have a convergence function and a deflection function, and a mirror 109 intended for deflection of the optical axis of an incident light beam, which are formed in one piece using a photolithography technology or plastic molding which derives from the technology.

Each of all mirror faces of this optical structure body 112 is provided with a reflection coating and each of other vertical walls of the optical structure body 112 is provided with a reflection coating or an absorption film to prevent disturbance light and stray light. Furthermore, there are provided cylindrical lenses 107a and 107b intended for converging incident light in the perpendicular direction to a surface of a substrate, for converging the outgoing light beams 105a and 105b in the perpendicular direction to a surface of a substrate to prevent them from reflecting and scattering at the substrates 101 and 102. In the figures, reference numeral 113 denotes a metallic wire for electrically connecting the light emitting element 103 to the electric wiring 110.

Next, a description will be made as to the operation of the optical distance sensor of embodiment 1.

The mirrors 106a and 106b intended for converging incident light in the parallel direction to a surface of a substrate converge the outgoing light beam 105 emitted out of the light emitting element 103 in the parallel direction to a surface of a substrate while bending the optical axis of the outgoing light beam 107. The cylindrical lens 107a converges the outgoing light beam 105 in the perpendicular direction to a surface of a substrate. After that, the outgoing light beam 105a is incident upon the object to be measured 108 after it is collimated or it is brought to a focus in a measurement range for the object.

The incident light is scattered by the object to be measured 108, and an outgoing light beam 105b, which is a part of the light scattered by the object, is then incident upon the optical sensor. The outgoing light beam 105b is then converged in the perpendicular direction to a surface of a substrate by the lens 107b intended for converging incident light in the perpendicular direction to a surface of a substrate, and is further converged in the parallel direction to a surface of a substrate by the mirrors 106c to 106f intended for converging incident light in the parallel direction to a surface of a substrate. In addition, after the optical axis of the outgoing light beam 105b is bent by 90 degrees by the mirror 109 intended for deflection of the optical axis of an incident light beam, the outgoing light beam 105b is incident upon the position sensitive light receiving element 104.

The curvature of the lens 107b intended for converging incident light in the perpendicular direction to a surface of a substrate and the curved shape and inclination against the optical axis of an incident light beam of each of the mirrors 106c to 106f intended for converging incident light in the parallel direction to a surface of a substrate are determined such that the outgoing light beam 105b is focused to a small light spot on the position sensitive light receiving element 104, the light spot being sufficiently smaller than an effective receiving surface of the position sensitive light receiving element 104. At this time, since the reflection and scattering of the outgoing light beams 105a and 105b by the substrates 101 and 102 are reduced by the lenses 107a and 107b intended for converging incident light in the perpendicular direction to a surface of a substrate, the optical loss can be reduced. As a result, the signal to noise ratio can be improved. Furthermore, to enlarge the acceptance angle of scattered light from the object to be measured 108, the central axis of the lens 107b intended for converging incident light in the perpendicular direction to a surface of a substrate is determined such that it intersects with the outgoing light beam 105b nearly at the center position of the measurement range.

When the object to be measured 108 moves away from the optical distance sensor by a distance Z, the light scattered from the object to be measured 108 changes from the outgoing light beam 105b to a light beam 105b' and therefore the incidence position of the light beam incident upon the position sensitive light receiving element 104 changes only by a distance X. Thus, by detecting the incidence position of the light beam incident upon the position sensitive light receiving element 104, the optical distance sensor can measure the location and displacement of the object to be measured 108.

Figure 5:
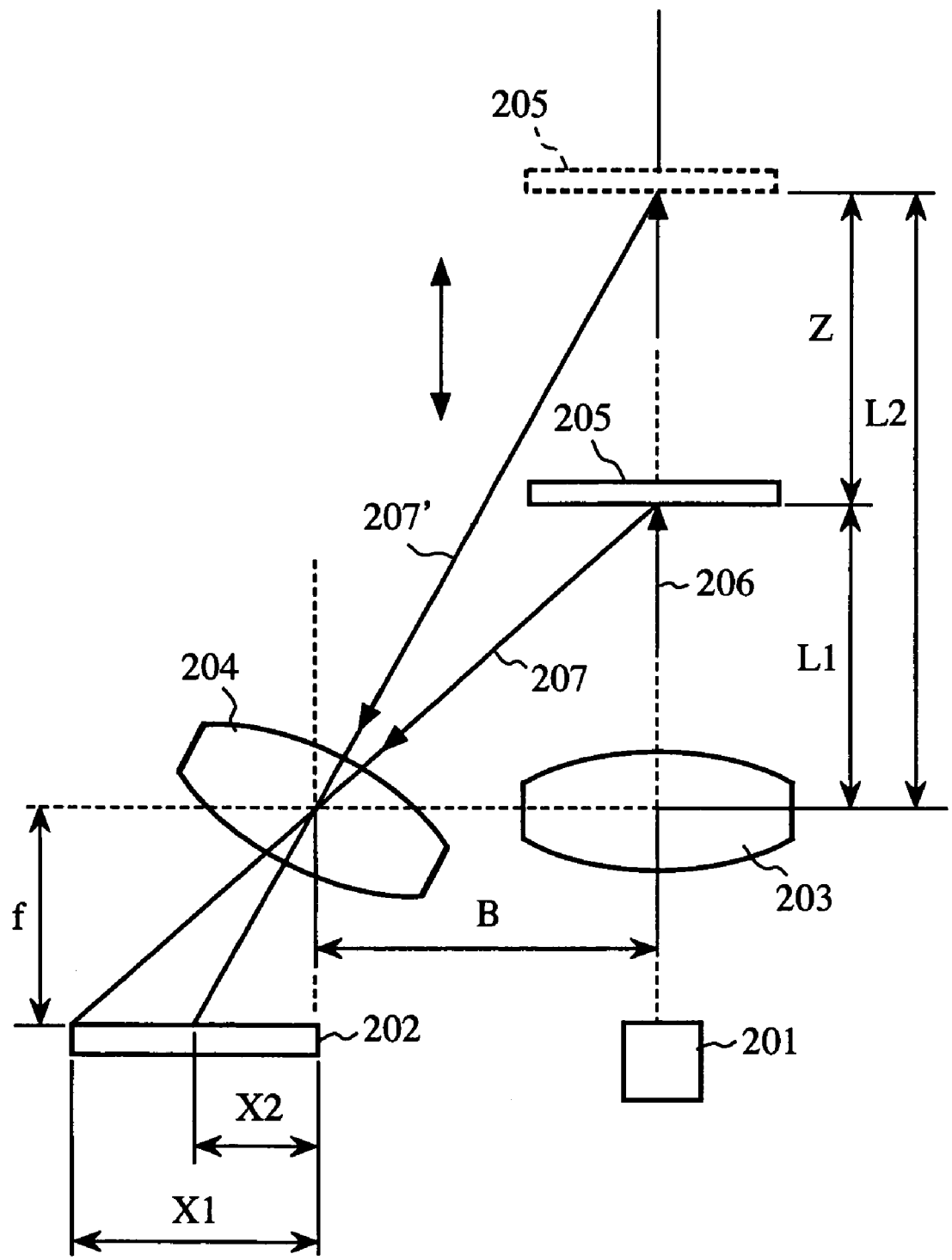
FIG. 5 is a view for explaining a triangulation technique which is performed by the optical distance sensor according to embodiment 1.

FIG. 5 is a view for explaining an principle according to which a general displacement sensor based on a triangulation technique for detecting light scattered from an object to be measured operates, the optical distance sensor according to embodiment 1 being applied to the displacement sensor. As in the case shown in FIG. 4, after a light beam 206 emitted out of a light emitting element 201 is converged by a lens 203, it is made to be incident upon an object to be measured 205. After a light beam 207, which is a part of light scatted by the object, is converged by another lens 204, it is incident upon a position sensitive light receiving element 202. When the object to be measured 205 moves away from the optical distance sensor, the light incident upon the position sensitive light receiving element changes from the light beam 207 to a light beam 207'. At this time, the locations L1 and L2 of the object to be measured 205 can be given by the following equations (1) and (2), respectively.

$$L1 = \frac{B \times f}{X1} \quad (1)$$

$$L2 = \frac{B \times f}{X2} \quad (2)$$

Therefore, the displacement Z of the object to be measured 205 is given by the following equation (3):

$$Z = L2 - L1 = B \times f \times \left(\frac{1}{X2} - \frac{1}{X1}\right) \quad (3)$$

In the general displacement sensor based on the principle of triangulation, as shown in the above equations, the location L1 of the object to be measured 205 is not proportional to but inversely proportional to the incidence position X1 of the light beam incident upon the position sensitive light receiving element. Therefore, the amount of change in the output power of the position sensitive light receiving element 202 depending on the displacement of the object to be measured 205 differs according to the location of the object to be measured 205. In other words, the measurement resolution differs according to the location of the object to be measured 205.

In the optical distance sensor according to this embodiment 1, as shown in FIG. 4, the length of an optical path extending from an aperture of the lens 107b intended for converging incident light in the perpendicular direction to a surface of a substrate, via which the outgoing light beam 105b is incident upon the lens 107b, to the position sensitive light receiving element 104 is lengthened compared with the width of the aperture. Furthermore, the shape of each of the curved mirrors 106c to 106f intended for converging incident light in the parallel direction to a surface of a substrate is not a part of a perfect circle but is a part of an out-of-round circle whose curvature continuously changes.

This results in an increase in the degree of flexibility in setting the incidence position of the outgoing light beam 105b incident upon the position sensitive light receiving element 104 which changes according to the location of the object to be measured 108. Mainly, the mirror faces 106e and 106f intended for converging incident light in the parallel direction to a surface of a substrate determine the position of incidence of the outgoing light beam 105b on the position sensitive light receiving element 104. Therefore, Z and X shown in FIG. 4 can be made to have a nearly direct proportional relationship, and the measurement resolution can be made not to depend on the location of the object to be measured 108.

When mirrors each having an out-of-round circle-shaped curved surface are combined like this, the accuracy of the relative position among the mirrors determines the performance of the combination of mirrors. In this embodiment, since the optical structure body 112 is formed in one piece using a photolithography technology or plastic molding which derives from the technology, the plurality of mirrors 106a to 106f intended for converging incident light in the parallel direction to a surface of a substrate can be formed with an extremely high degree of relative positioning accuracy. As a matter of course, it is also possible to determine the shape of the curved surface and inclination against the optical axis of an incident light beam of each of the mirrors 106c to 106f intended for converging incident light in the parallel direction to a surface of a substrate so that they are based on the above-mentioned principle equations derived for the general displacement sensor.

As mentioned above, in accordance with this embodiment 1, since the optical structure body 112 is formed in one piece using a photolithography technology or plastic molding which derives from the technology, the downsizing of the optical distance sensor is facilitated and the plurality of mirrors 106a to 106f intended for converging incident light in the parallel direction to a surface of a substrate can be formed with an extremely high degree of relative positioning accuracy. Furthermore, since the lenses 107a and 107b intended for converging incident light in the perpendicular direction to a surface of a substrate are arranged so that they are in contact with at least two surfaces of a vertical structure disposed in the optical structure body 112, the positioning of those lenses is facilitated and the accuracy of the relative positions of those lenses with respect to the plurality of mirrors intended for converging incident light in the parallel direction to a surface of a substrate can be improved. As a result, there can be provided a small-size and low-cost optical distance sensor which can be applied to general displacement sensors based on the principle of triangulation without having to use a 3-layer waveguide with a large manufacturing cost and hard-to-handle optical fibers.

Figure 6A:
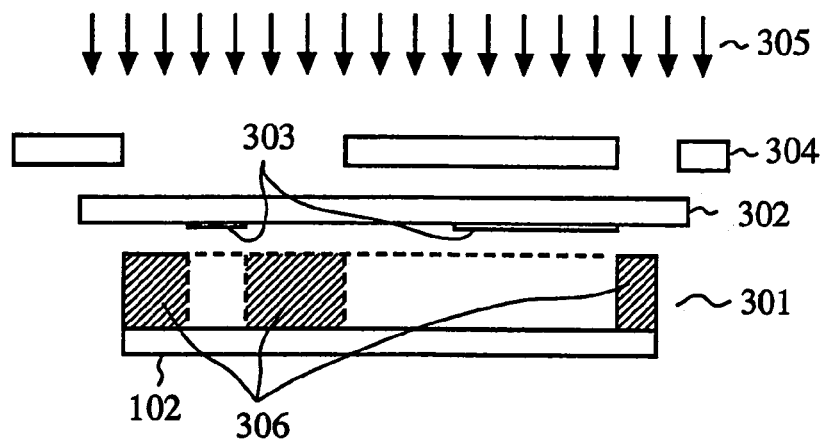
FIGS. 6(a)–6(c) are views for explaining processes of producing an optical structure body.
Figure 6B:
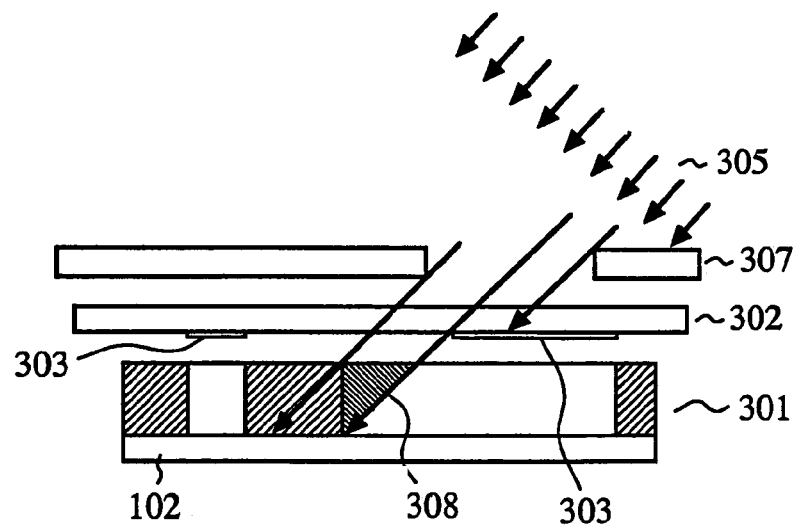
Figure 6C:
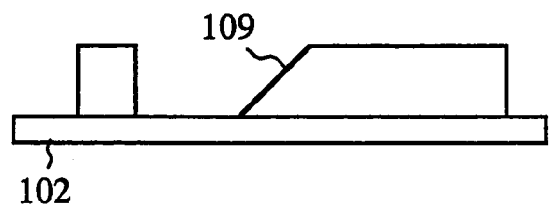

Referring now to FIGS. 6(a)–6(c), there are illustrated views for explaining processes of producing the optical structure body 112. A resist material, such as PMMA (polymethyl methacrylate) for use in photolithography, is used. X rays are the best for an exposure with good accuracy of a thick film resist. A process known by the name of LIGA (an acronym for a German technical term, LI: Lithography=Lithographie, G: Galvanoformung= electroforming, and A: Abformung=molding) is applicable. Since X rays have good straightness, one or more accurate cylindrical structures each having a thickness ranging from hundreds of micrometers to about 1 millimeter can be transformed in the thick film resist.

In FIG. 6(a), a resist 301 is arranged on the substrate 102. X-ray absorption films 303 made of a material, such as gold, on which the shapes of the plurality of mirrors 106a to 106f intended for converging incident light in the parallel direction to a surface of a substrate and other structures extending in the perpendicular direction to a surface of a substrate are projected, respectively, are formed on a mask 302. An aperture 304 made of such an x-ray absorption material as brass is disposed above the mask 302, and X rays 305 are applied from the upper side of the aperture 304. Some areas of the resist 301, which are not hidden by the x-ray absorption films 303 and by the aperture 304, i.e., only exposure areas 306 are exposed to X rays.

In FIG. 6(b), the aperture 304 is replaced by another aperture 307, and X rays are further applied to the resist 301 while the direction of the irradiation being inclined 45 degrees against the vertical. In the case of FIG. 6(b), only an exposure area 308 is irradiated with X rays 305. After exposed to X rays, the exposure areas 306 and 308 are removed when developed. As a result, vertical structures, such as the plurality of mirrors 106a to 106f intended for converging incident light in the parallel direction to a surface of a substrate and the mirror 109 intended for deflection of the optical axis of an incident light beam are formed in one piece on the substrate 102, as shown in FIG. 6(c).

In the case of an optical distance sensor which does not use the mirror 109 intended for deflection of the optical axis of an incident light beam, the process of FIG. 6(b) is omitted. In general, since PMMA is a transparent resin, each of all the mirror faces is provided with a reflection coating formed through deposition or the like, and each of other vertical walls is provided with either a reflection coating or an absorption film to prevent stray light.

Furthermore, to improve the quality of mass production and to reduce the manufacturing cost, a molding process can be introduced into the above-mentioned LIGA process. In this case, the substrate on which the developed optical structure body is mounted is electroformed so that metal such as Ni is deposited on a surface of the substrate. The metal is separated from the electroformed substrate so that a blank body having the same shape as the optical structure body is transformed in the metal. When this metal is used as a mold insert and plastic molding such as injection molding is carried out using the mold insert, many copies of the optical structure body can be provided.

The above-mentioned LIGA process can be applied to the process of producing of the lenses 107a and 107b intended for converging incident light in the perpendicular direction to a surface of a substrate. Only one X-ray exposure is needed for the process of producing the lenses 107a and 107b because cylindrical lenses are used as the lenses 107a and 107b in this embodiment, while two exposures are carried out in the case shown in FIG. 6.

Since the lenses 107a and 107b intended for converging incident light in the perpendicular direction to a surface of a substrate are arranged so that they are in contact with at least two surfaces of a vertical structure disposed in the optical structure body 112, the positioning of those lenses is facilitated and the relative positioning accuracy of those lenses with respect to the plurality of mirrors 106a to 106f intended for converging incident light in the parallel direction to a surface of a substrate can be improved. It is preferable to use an ultraviolet curing resin bond with a low viscosity to maintain the positioning accuracy when securing the lenses 107a and 107b to the optical structure body 112.

The optical structure body 112 provided with the lenses 107a and 107b intended for converging incident light in the perpendicular direction to a surface of a substrate and the substrate 102 (second substrate) are combined with the other substrate 101 (first substrate) provided with the light emitting element 103 and the position sensitive light receiving element 104 by using a positioning mark or the like (not shown in the figure). It is preferable to use an ultraviolet curing resin bond with a low viscosity to maintain the positioning accuracy when securing the optical structure body 112 and the second substrate 102 to the first substrate 101.

In this embodiment 1, two mirrors intended for converging the outgoing light beam 105a in the parallel direction to a surface of a substrate and four mirrors intended for converging the outgoing light beam 105b in the parallel direction to a surface of a substrate are provided. The present embodiment is not limited to this case, and one or more mirrors intended for converging the outgoing light beam 105a in the parallel direction to a surface of a substrate and one or more mirrors intended for converging the outgoing light beam 105b in the parallel direction to a surface of a substrate can be provided. The whole optical system intended for converging incident light in the parallel direction to a surface of a substrate with high accuracy can be implemented by a combination of concave mirrors and convex mirrors rather than a combination of only concave mirrors.

Embodiment 2

Figure 7:
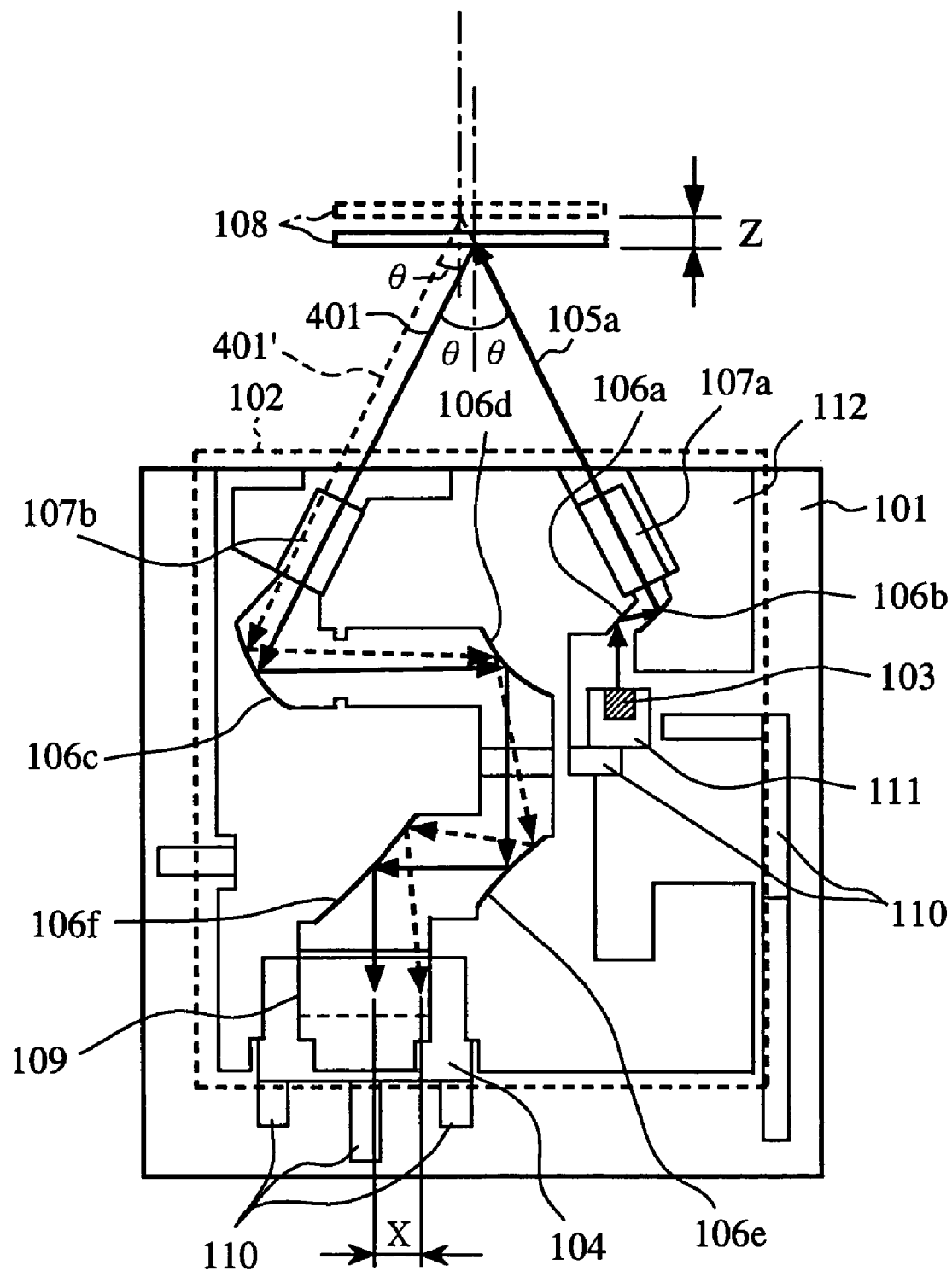
FIG. 7 is a plan view showing an optical distance sensor according to embodiment 2 of the present invention.

FIG. 7 is a plan view showing an optical distance sensor according to embodiment 2 of the present invention. Lenses 107a and 107b each intended for converging an incident light beam in a perpendicular direction to a surface of a substrate are arranged so that an outgoing light beam 105a emerging from the lens 107a hits an object to be measured 108 and light 401 directly reflected by the object is incident upon the other lens 107b.

Next, a description will be made as to the operation of the optical distance sensor according to embodiment 2.

The outgoing light beam 105a emitted out of a light emitting element 103 is collimated or is brought to a focus in a measurement range for the object to be measured by mirrors 106a and 106b intended for converging incident light in a parallel direction to a surface of a substrate and the lens 107a intended for converging incident light in the perpendicular direction to a surface of a substrate, so that the outgoing light beam 105a is incident upon the object to be measured 108.

A directly reflected light beam 401 among light beams reflected by the object to be measured 108 is mainly incident upon the lens 107b intended for converging incident light in the perpendicular direction to a surface of a substrate. As in the case of embodiment 1, the directly reflected light beam 401 is then converged by the lens 107b intended for converging incident light in the perpendicular direction to a surface of a substrate and by mirrors 106c to 106f intended for converging incident light in the parallel direction to a surface of a substrate. Then, after the optical axis of the directly reflected light beam 401 is bent by 90 degrees by a mirror 109 intended for deflection of the optical axis of an incident light beam, the directly reflected light beam 401 is incident upon a position sensitive light receiving element 104. The curvature of the lens 107b intended for converging incident light in the perpendicular direction to a surface of a substrate and the shape of the curved surface and inclination against the optical axis of an incident light beam of each of the mirrors 106c to 106f intended for converging incident light in the parallel direction to a surface of a substrate are determined such that the directly reflected light beam 401 is focused to a small light spot on the position sensitive light receiving element 104, the light spot being sufficiently smaller than an effective receiving surface of the position sensitive light receiving element 104.

When the object to be measured 108 moves away from the optical distance sensor by a distance Z, the directly reflected light scattered from the object to be measured 108 changes from the directly reflected light beam 401 to a directly reflected light beam 401 and therefore the incidence position of the light beam incident upon the position sensitive light receiving element 104 changes only by a distance X. Thus, by detecting the incidence position of the light beam incident upon the position sensitive light receiving element 104, the optical distance sensor can measure the location and displacement of the object to be measured 108.

Figure 8:
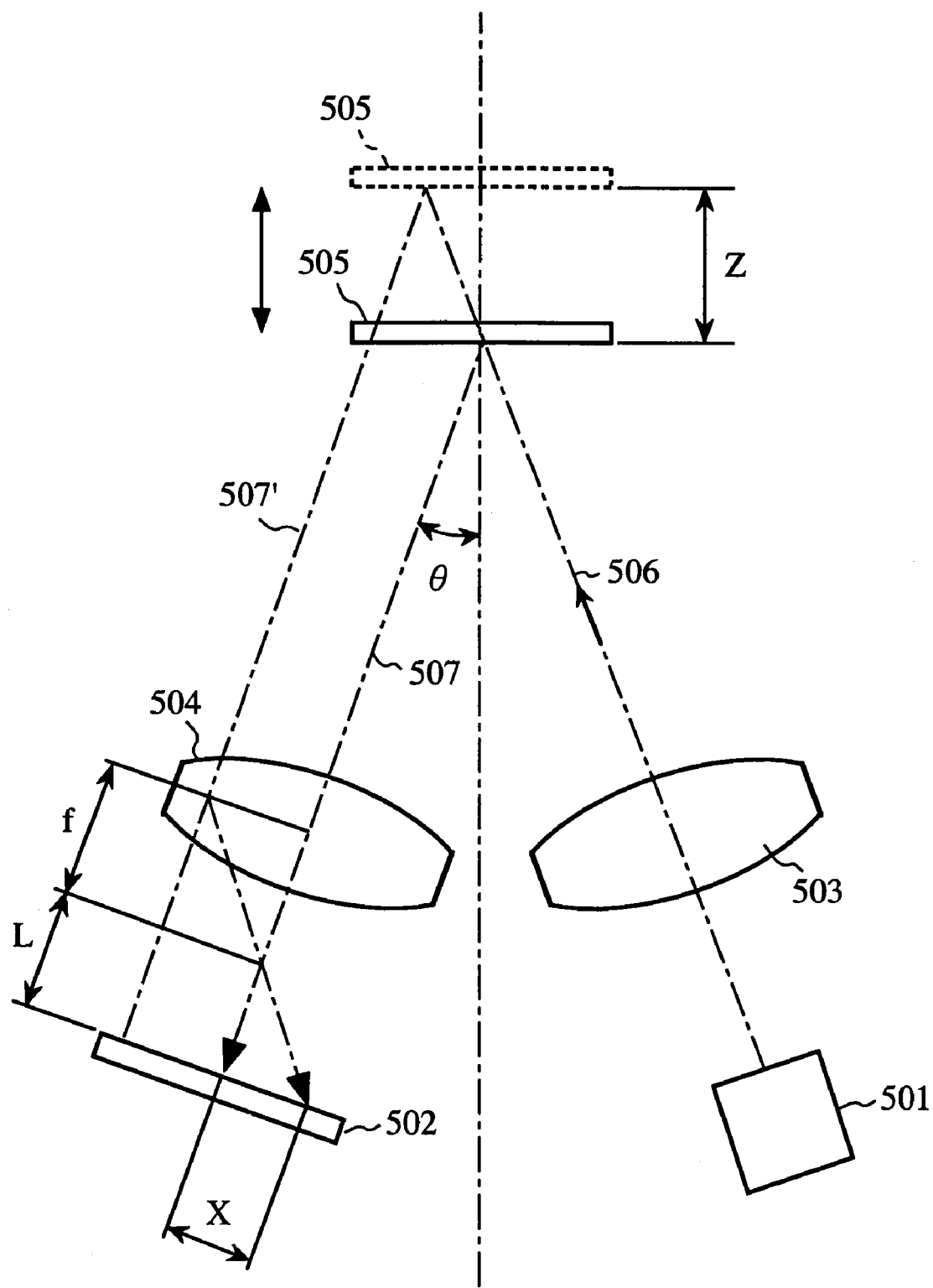
FIG. 8 is a view for explaining a triangulation technique which is performed by the optical distance sensor according to embodiment 2.

FIG. 8 is a view for explaining an principle according to which a general displacement sensor based on a triangulation technique for detecting light scattered from an object to be measured operates, the optical distance sensor according to embodiment 2 being applied to the displacement sensor. As in the case shown in FIG. 7, after a light beam 506 emitted out of a light emitting element 501 is converged by a lens 503, it is made to be incident upon an object to be measured 505. After a directly reflected light beam 507 is converged by another lens 504, it is incident upon a position sensitive light receiving element 502. When the object to be measured 505 moves away from the optical distance sensor, the light beam incident upon the position sensitive light receiving element changes from the one 507 to a light beam 507'. At this time, the displacement Z of the object to be measured 505 can be given by the following equation (4). Thus, when X is detected, the displacement Z of the object can be measured.

$$Z = \frac{f \times X}{2 \times L \times \sin\theta} \quad (4)$$

The shape of the curved surface and inclination against the optical axis of an incident light beam of each of the mirrors intended for converging incident light in the parallel direction to a surface of a substrate are determined such that they are based on the principle.

As mentioned above, in accordance with this embodiment 2, since the optical structure body 112 is molded in one piece using a photolithography technology or plastic molding which derives from the technology, the downsizing of the optical distance sensor is facilitated and the plurality of mirrors 106a to 106f intended for converging incident light in the parallel direction to a surface of a substrate can be formed with an extremely high degree of relative positioning accuracy. Furthermore, since the lens 107a and 107b intended for converging incident light in the perpendicular direction to a surface of a substrate are arranged so that they are in contact with at least two surfaces of a vertical structure disposed in the optical structure body 112, the positioning of those lenses is facilitated and the accuracy of the relative positions of those lenses with respect to the plurality of mirrors intended for converging incident light in the parallel direction to a surface of a substrate can be improved.

Embodiment 3

Figure 9:
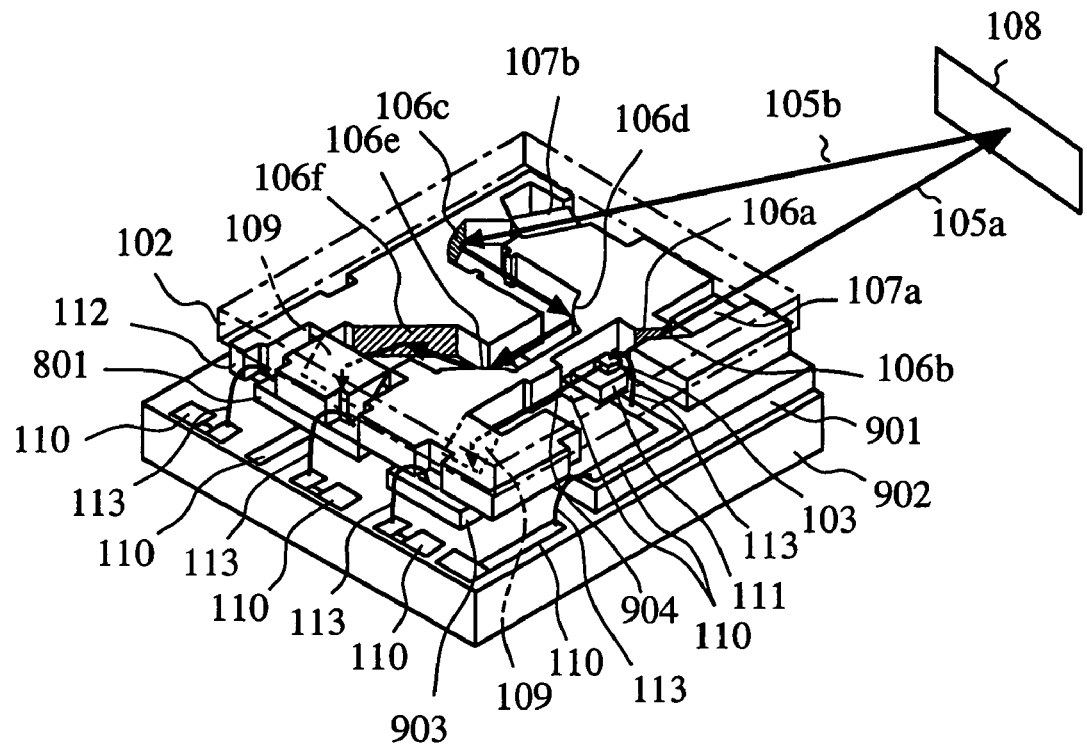
FIG. 9 is a perspective view showing an optical distance sensor according to embodiment 3 of the present invention.

FIG. 9 is a perspective view showing an optical distance sensor according to embodiment 3 of the present invention. A laminated substrate which is a combination of a substrate 901 provided with a light emitting element 103 and another substrate 902 provided with a light receiving element 801 implements functionality similar to that provided by the substrate 101 (first substrate) shown in embodiments 1 and 2. The electric connection between the two substrates 901 and 902 is achieved by a metallic wire 113.

In other words, the light receiving element 801 does not have to be monolithically formed, unlike those of embodiments 1 and 2. A semiconductor laser can be used as the light emitting element 103. At this time, by adding an optical axis deflection mirror 109 and a light receiving element 903, such as a photo diode or phototransistor, the power of a light beam 904 travelling opposite in direction to the travel of an outgoing light beam 105a can be detected. Since the power of the outgoing light beam 105a and that of the light beam 904 are in direct proportion, the power of the outgoing light beam 105a emitted from the optical distance sensor can be controlled by controlling the power of the light beam 904. To prevent the light receiving elements 801 and 903 from being in contact with the optical structure body 112, the heights of the light receiving elements 801 and 903 are set to be lower than that of the substrate 901.

As mentioned above, in accordance with embodiment 3, distance measurements can be carried out by optimizing the shape of the optical structure body 112 and the shapes of the lenses 107a and 107b intended for converging incident light in the perpendicular direction to a surface of a substrate, like embodiments 1 and 2.

Embodiment 4

Figure 10:
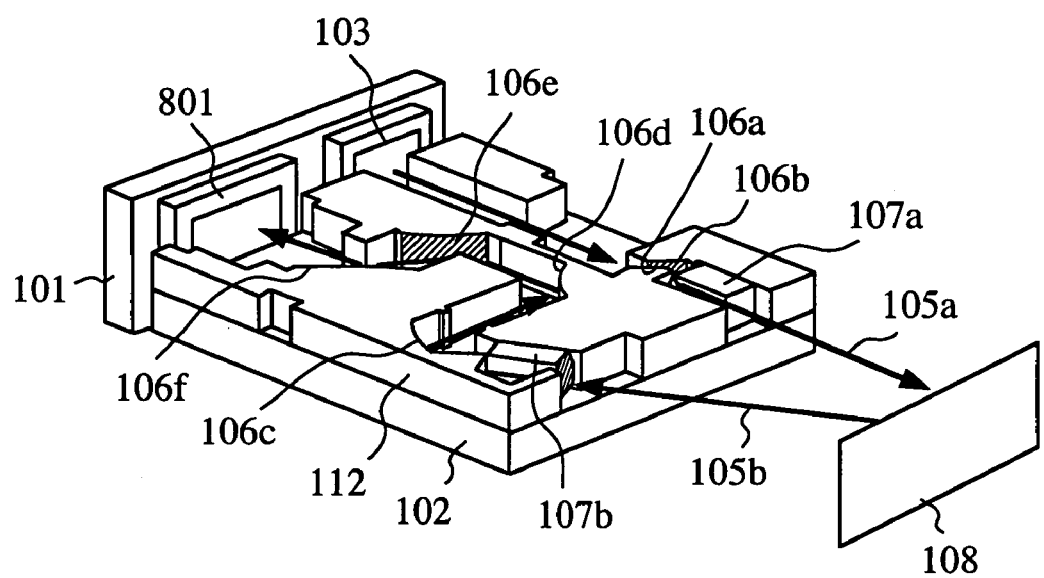
FIG. 10 is a perspective view showing an optical distance sensor according to embodiment 4 of the present invention.

FIG. 10 is a perspective view showing an optical distance sensor according to embodiment 4 of the present invention. In this optical distance sensor, a substrate 101 provided with a light emitting element 103 and a light receiving element 801 is combined with another substrate 102 provided with an optical structure body 112 so that the substrate 101 is attached to a side of the other substrate 102, and a semiconductor laser of vertical cavity type is used as the light emitting element 103.

Therefore, no mirror 109 intended for deflection of the optical axis of an incident light beam is needed in the optical structure body 112, unlike embodiments 1 and 2. Although electric I/Os of the light emitting element 103 and the light receiving element 801 are not shown in the figure, they are carried out through electric wiring and metallic wires. Furthermore, the optical structure body 112 can be covered with a board made of such a material as silicon and having the same size as the substrate 102 to prevent disturbance light. In general, semiconductor lasers of vertical cavity type have a narrow angle of light emission because they have a wide surface area of light emission. In addition, since semiconductor lasers of vertical cavity type emit a circular light beam, the optical system design for beam forming becomes easy according to embodiment 4.

As mentioned above, in accordance with embodiment 4, distance measurements can be carried out by optimizing the shape of the optical structure body 112 and the shapes of lenses 107a and 107b intended for converging incident light in the perpendicular direction to a surface of a substrate, like embodiments 1 and 2.

Embodiment 5

Figure 11:
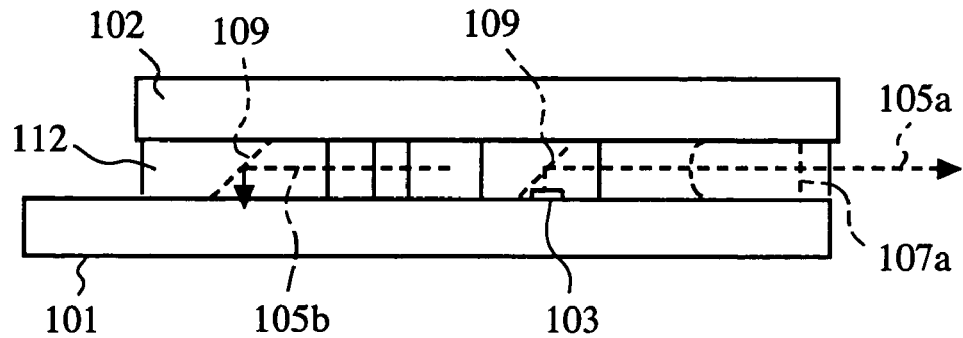
FIG. 11 is a side view showing an optical distance sensor according to embodiment 5 of the present invention.

FIG. 11 is a side view showing an optical distance sensor according to embodiment 5 of the present invention. A semiconductor laser of vertical cavity type is used as a light emitting element 103, a mirror 109 intended for deflection of the optical axis of an incident light beam is disposed above the light emitting element 103, and the direction in which an outgoing light beam 105a emitted out of the light emitting element 103 is travelling is deflected by 90 degrees by the optical axis deflection mirror 109.

As mentioned above, in accordance with embodiment 5, distance measurements can be carried out by optimizing the shape of an optical structure body 112 and the shapes of lenses 107a and 107b intended for converging incident light in a perpendicular direction to a surface of a substrate, like embodiments 1 and 2.

Embodiment 6

Figure 12:
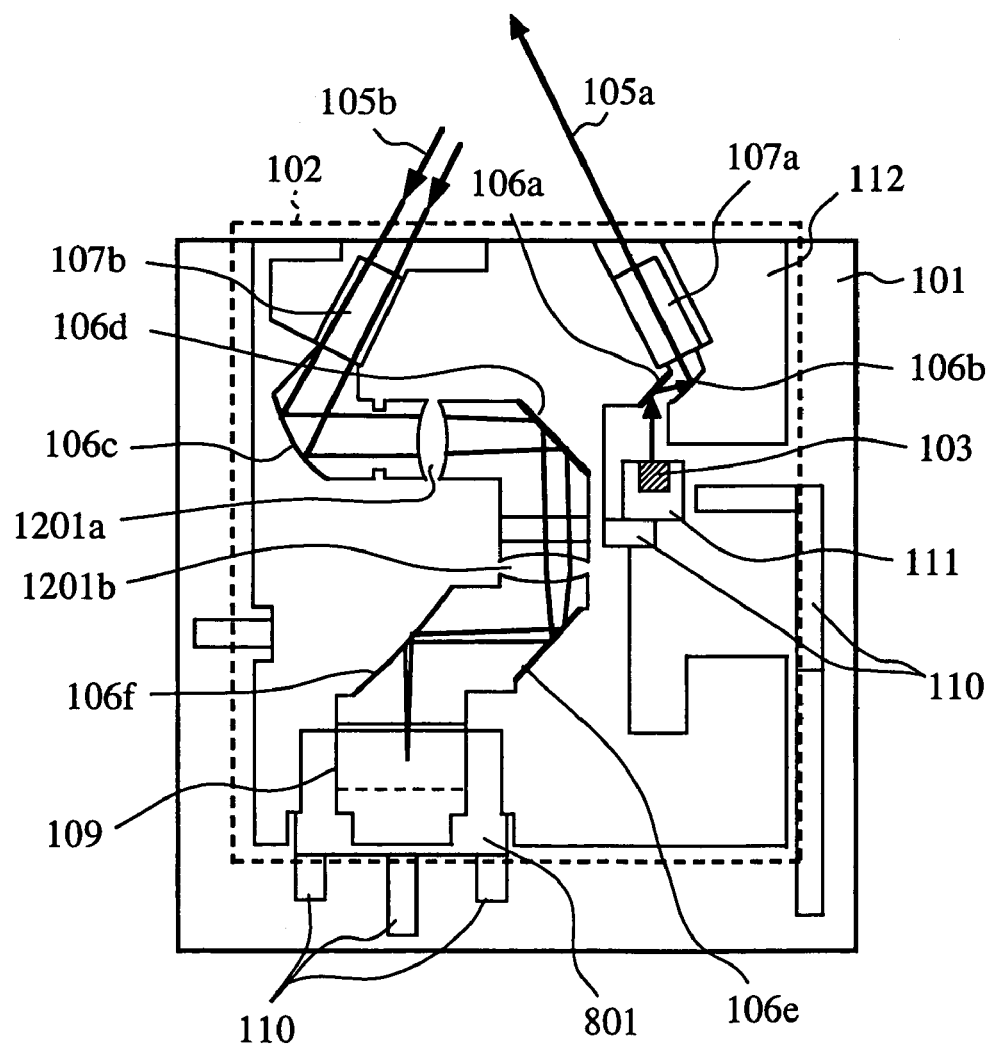
FIG. 12 is a plan view showing an optical distance sensor according to embodiment 6 of the present invention.

FIG. 12 is a plan view showing an optical distance sensor according to embodiment 6 of the present invention. Lenses 1201a and 1201b (lenses intended for converging incident light in a parallel direction to a surface of a substrate) having a function of converging an incident light beam in the parallel direction to a surface of a substrate, as well as mirrors 106a to 106f intended for converging incident light in the parallel direction to a surface of a substrate and a mirror 109 intended for deflection of the optical axis of an incident light beam, are integrally formed in an optical structure body 112. In the case of this embodiment, the function of converging an outgoing light beam 105b in the parallel direction to a surface of a substrate can be mainly provided for the combination of lenses 1201a and 1201b. Some or all of the mirrors 106c to 106f intended for converging incident light in the parallel direction to a surface of a substrate can be plane mirrors according to settings.

In the case of this embodiment, it is preferable that the optical structure body 112 is made of a transparent resin, such as PMMA, which the outgoing light beam 105b can penetrate. Though the plurality of mirrors 106a to 106f intended for converging incident light in the parallel direction to a surface of a substrate and the mirror 109 intended for deflection of the optical axis of an incident light beam should have a reflection coating formed through deposition or the like, it is necessary to dispose a mask made of such a material as brass on the optical structure body 112 to prevent the reflection coating from spreading to the lenses 1201a and 1201b intended for converging incident light in the parallel direction to a surface of a substrate when forming the reflection coating.

While the plurality of mirrors 106c to 106f intended for converging incident light in the parallel direction to a surface of a substrate are effective in the downsizing of the optical structure body 112 when it is necessary to lengthen an optical path extending from the lens 107b intended for converging incident light in the perpendicular direction to a surface of a substrate to a light receiving element 801, the plurality of mirrors 106c to 106f intended for converging incident light in the parallel direction to a surface of a substrate are not needed when it is unnecessary to lengthen the optical path and the outgoing light beam 105b can be converged in the parallel direction to a surface of a substrate only by the lenses intended for converging incident light in the parallel direction to a surface of a substrate. It is also possible to use lenses intended for converging incident light in the parallel direction to a surface of a substrate instead of the mirrors 106a and 106b intended for converging the outgoing light beam 105a in the parallel direction to a surface of a substrate.

As mentioned above, in accordance with embodiment 6, distance measurements can be carried out by optimizing the shape of the optical structure body 112 and the shapes of the lenses 107a and 107b intended for converging incident light in the perpendicular direction to a surface of a substrate, like embodiments 1 and 2.

INDUSTRIAL APPLICABILITY

As mentioned above, the optical distance sensor according to the present invention is suitable for measuring a distance from a reference point to an object to be measured or a displacement of the object based on a triangulation technique.

What is claimed is:

1. An optical distance sensor that applies a light beam from a light emitting element to an object, detects a light beam reflected by the object by using a light detecting element, and measures a distance from a reference point to the object or a displacement of the object based on a triangulation technique, said optical distance sensor comprising:

a first substrate on which are disposed a light emitting element and a light detecting element;

a one-piece optical structure body on a second substrate, the optical structure body having a plurality of optical elements for converging incident light in a direction parallel to a surface of the second substrate, and for converging an outgoing light beam from the light emitting element and a light beam reflected by the object in the direction parallel to the surface of the second substrate; and lenses for converging incident light in a direction perpendicular to the surface of the second substrate, and for converging the outgoing light beam from the light emitting element and the light beam reflected by the object in the direction perpendicular to the surface of the second substrate, respectively.

* * * * *